(12) United States Patent
Seefeldt et al.

(10) Patent No.: US 7,480,661 B2
(45) Date of Patent: Jan. 20, 2009

(54) QUERY SERVICES FOR DATABASE SYSTEM

(75) Inventors: Daniel Edward Seefeldt, Fargo, ND (US); Michael R. Simons, Fargo, ND (US); Paul R. Bramel, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 10/201,545

(22) Filed: Jul. 22, 2002

(65) Prior Publication Data

US 2004/0015511 A1    Jan. 22, 2004

(51) Int. Cl.
*G06F 7/00* (2006.01)
*G06F 12/00* (2006.01)
*G06F 15/16* (2006.01)

(52) U.S. Cl. .................... 707/100; 707/3; 707/200; 709/203

(58) Field of Classification Search .......... 707/1–10, 707/100–104.1, 200–201; 709/203, 224
See application file for complete search history.

(56) References Cited

U.S. PATENT DOCUMENTS

| | | | | |
|---|---|---|---|---|
| 5,809,505 A * | 9/1998 | Lo et al. | ............. | 707/102 |
| 6,076,092 A * | 6/2000 | Goldberg et al. | ........ | 707/103 R |
| 6,097,391 A * | 8/2000 | Wilcox | ............. | 715/776 |
| 6,141,660 A * | 10/2000 | Bach et al. | ............. | 707/103 R |
| 6,163,781 A * | 12/2000 | Wess, Jr. | ............. | 707/103 X |
| 6,192,369 B1 * | 2/2001 | Doan et al. | ............. | 707/103 R |
| 6,199,195 B1 * | 3/2001 | Goodwin et al. | ............. | 717/104 |
| 6,226,692 B1 * | 5/2001 | Miloushev et al. | ............. | 719/316 |
| 6,233,586 B1 * | 5/2001 | Chang et al. | ............. | 707/103 R |
| 6,263,328 B1 * | 7/2001 | Coden et al. | ............. | 707/3 |
| 6,370,541 B1 * | 4/2002 | Chou et al. | ............. | 707/103 X |
| 6,374,252 B1 * | 4/2002 | Althoff et al. | ............. | 707/102 |
| 6,418,448 B1 * | 7/2002 | Sarkar | ............. | 707/104.1 |
| 6,484,180 B1 * | 11/2002 | Lyons et al. | ............. | 707/103 R |
| 6,560,609 B1 * | 5/2003 | Frey et al. | ............. | 707/103 R |
| 6,658,407 B1 * | 12/2003 | Bailey | ............. | 707/3 |
| 6,741,982 B2 * | 5/2004 | Soderstrom et al. | ............. | 707/3 |
| 6,769,124 B1 * | 7/2004 | Schoening et al. | ............. | 719/316 |
| 6,785,880 B1 * | 8/2004 | Beisiegel et al. | ............. | 717/106 |
| 6,850,951 B1 * | 2/2005 | Davison | ............. | 707/102 |
| 6,915,291 B2 * | 7/2005 | Carlson et al. | ............. | 707/2 |
| 6,947,929 B2 * | 9/2005 | Bruce et al. | ............. | 707/5 |
| 7,054,858 B2 * | 5/2006 | Sutherland | ............. | 707/4 |
| 2003/0033277 A1 * | 2/2003 | Bahulkar et al. | ............. | 707/1 |
| 2003/0163439 A1 * | 8/2003 | Hankin et al. | ............. | 707/1 |
| 2003/0163479 A1 * | 8/2003 | Mathews et al. | ............. | 707/102 |
| 2003/0208493 A1 * | 11/2003 | Hall et al. | ............. | 707/100 |

* cited by examiner

*Primary Examiner*—Miranda Le
(74) *Attorney, Agent, or Firm*—Westman, Champlin & Kelly P.A.

(57) ABSTRACT

A query web service wraps functionality of a number of database query subsystems. The query web service exposes interfaces with methods, when invoked, perform a wide variety of functions related to querying the database. Such methods allow a user to write to the interface to create, manage and execute queries against the entities in the database.

38 Claims, 9 Drawing Sheets

```
<queryState>
    .
    .
    <request>
    .
    .
    </request>
    <queryDefinition>
        .
        .
        <views>
        .
        .
        <availableProperties>
        .
        .
        <selectedProperties>
        .
        .
        <sorts>
        .
        .
        <parameters>
        .
        .
        <restriction>
    </queryDefinition>
    <diagnostics>
    .
    .
    </diagnostics>
    <queryResults>
    .
    .
    </queryResults>
    <hypermedia>
    .
    .
    </hypermedia>
    <bookMark>
    .
    .
    </bookMark>
```

FIG. 8

QUERY SERVICES FOR DATABASE SYSTEM

BACKGROUND OF THE INVENTION

The present invention relates to database systems. More specifically, the present invention relates to providing services that support queries against a database system.

A number of different databases will first be discussed. In conventional relational databases, all data are stored in named tables. The tables are described by their features. In other words, the rows of each table contain items of identical type, and the definitions of the columns of the table (i.e., the column names and the data types stored in the column) describe the attributes of each of the instances of the object. By identifying its name, its column names and the data types of the column contents, a table is completely described. Queries to a relational data base are formulated in a query language. One such language is SQL (Structure Query Language) which is widely used in commercial relational data base systems. The data types offered by SQL can be classified as character arrays (names), numbers, and data types related to date and time. Tables can be modified or combined by several operations of relational algebra such as the application of Boolean operators, projection (i.e. selection of columns) or the Cartesian product.

Relational databases offer several advantages. Database queries are based on a comparison of the table contents. Thus, no pointers are required in relational data bases, and all relations are treated uniformly. Further, the tables are independent (they are not related by pointers), so it is easier to maintain dynamic data sets. The tables are easily expandable by simply adding new columns. Also, it is relatively easy to create user-specific views from relational databases.

There are, however, a number of disadvantages associated with relational databases as well. For example, access to data by reference to properties is not optimal in the classical relational data model. This can make such databases cumbersome in many applications.

Another recent technology for database systems is referred to as object oriented data base systems. These systems offer more complex data types in order to overcome the restrictions of conventional relational databases. In the context of object oriented data base models, an "object" includes both data and the methods which can be applied to the object. Each object is a concrete instance of an object class defining the attributes and methods of all its instances. Each instance has its unique identifier by which it can be referred to in the database.

Object oriented databases operate under a number of principles. One such principle is referred to as inheritance. Inheritance means that new object classes can be derived from another class. The new classes inherit the attributes and methods of the other class (the super-class) and offer additional attributes and operations. An instance of the derived class is also an instance of the super-class. Therefore, the relation between a derived class and its super-class is referred to as the "isA" relation.

A second principle related to object oriented databases is referred to as "aggregation." Aggregation means that composite objects may be constructed as consisting of a set of elementary objects. A "container object" can communicate with the objects contained therein by their methods of the contained objects. The relation between the container object and its components is called a "partOf" relation because a component is a part of the container object.

Yet another principle related to object oriented databases is referred to as encapsulation. According to encapsulation, an application can only communicate with an object through messages. The operations provided by an object define the set of messages which can be understood by the object. No other operations can be applied to the object.

Another principle related to object oriented databases is referred to as polymorphism. Polymorphism means that derived classes may re-define methods of their super-classes.

Objects present a variety of advantages. For example, operations are an important part of objects. Because the implementations of the operations are hidden to an application, objects can be more easily used by application programs. Further, an object class can be provided as an abstract description for a wide variety of actual objects, and new classes can be derived from the base class. Thus, if an application knows the abstract description and using only the methods provided by, the application can still accommodate objects of the derived classes, because the objects in the derived classes inherit these methods. However, object oriented databases are not yet as widely used in commercial products as relational data bases.

Yet another database technology attempts to combine the advantages of the wide acceptance of relational data bases and the benefits of the object oriented paradigm. This technology is referred to as object-relational database systems. These databases employ a data model that attempts to add object oriented characteristics to tables. All persistent (database) information is still in tables, but some of the tabular entries can have richer data structure. These data structures are referred to as abstract data types (ADTs). An ADT is a data type that is constructed by combining basic alphanumeric data types. The support for abstract data types presents certain advantages. For example, the operations and methods associated with the new data type can be used to index, store, and retrieve records based on the content of the new data type.

Some conventional object-relational databases support an extended form of SQL, sometimes referred to as ObjectSQL. The extensions are provided to support the object model (e.g., queries involving object attributes). However, these object-relational databases are still relational because the data is stored in tables of rows and columns, and SQL, with some extensions, is the language for data definition, manipulation, and query. Both the target of a query and the result of a query are still tables. The extended SQL language is often still the primary interface to the database. Therefore, there is no direct support of host object languages and their objects. This forces programmers to continue to translate between objects and tables.

SUMMARY OF THE INVENTION

A query service wraps functionality of a number of database query subsystems. The query service exposes interfaces with methods, when invoked, perform a wide variety of functions related to querying the database. Such methods allow a user to write to the interface to create, manage and execute queries against the entities (also referred to as "objects") in the database.

The query service can expose functionality for a user to execute Adhoc queries which are used to retrieve desired data, without retrieving entire objects. The functionality can also include access to a folder subsystem which is used to persist queries and hierarchically arranged references to the queries. The functionality can also include access to a metadata system that provides a rich set of data about entities, their properties, and associations. Further, the functionality can provide access to a hypermedia service that provides links to information related to a queries result set.

In addition, the query service component can be exposed as a web service. In the same architecture, the query service component can also be made available for use by applications that are on the same service, through direct calls.

BRIEF DESCRIPTION OF THE DRAWINGS

FIG. 8 illustrates the elements of one illustrative API call.

DETAILED DESCRIPTION OF ILLUSTRATIVE EMBODIMENTS

Figure 1:
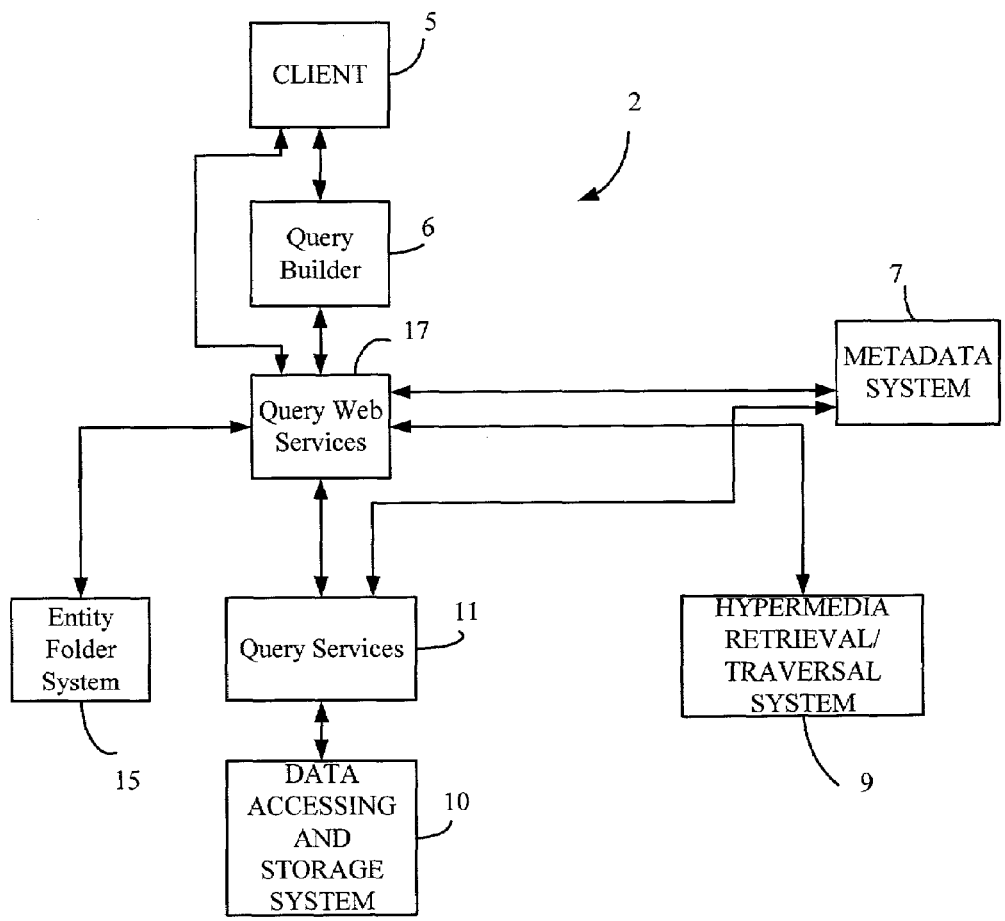
FIG. 1 is a block diagram of a query servicing system.

FIG. 1 is a block diagram of a query service system 2 in accordance with one illustrative embodiment of the present invention. System 2 shows that a client 5 is operably coupled to a plurality of functional resources including query builder 6, metadata system 7, hypermedia retrieval/traversal system 9, query services system 11 (which is, in turn, coupled to data accessing and storage system 10), and entity folder system 15. Client 5 is connected to the functional resources (other than query builder 6) through a query web services component 17.

In one illustrative embodiment, query web services component 17 is a set of objects that expose a set of interfaces (such as application programming interfaces—APIs) having methods that can be invoked by client 5. One illustrative embodiment of the interfaces, object models, and schema is attached as an appendix hereto. When the methods are invoked (i.e., when client 5 writes to the API), client 5 can employ the functions provided by systems 7-15. Thus, query web services component 17 wraps the functions of systems 7-15 and provides those functions to client 5 and allows client 5 to access those functions through the interfaces on query web services component 17.

Systems 7-15 can perform a wide variety of different functions, other than those described with respect to systems 7-15 below, or additional functions in addition to those described. However, a brief description of one embodiment of systems 7-15 will be undertaken simply for the sake of clarity and completeness. Also, one embodiment of an exemplary computing system environment will be discussed as well. The order in which these are discussed is as follows: data accessing and storage system 10 is discussed with respect to FIG. 2, a general computing environment is discussed with respect to FIG. 3, hypermedia system 9 is discussed with respect to FIGS. 4-5, and metadata system 7, query builder 6 and folder system 15 are discussed in more general terms.

Figure 2:
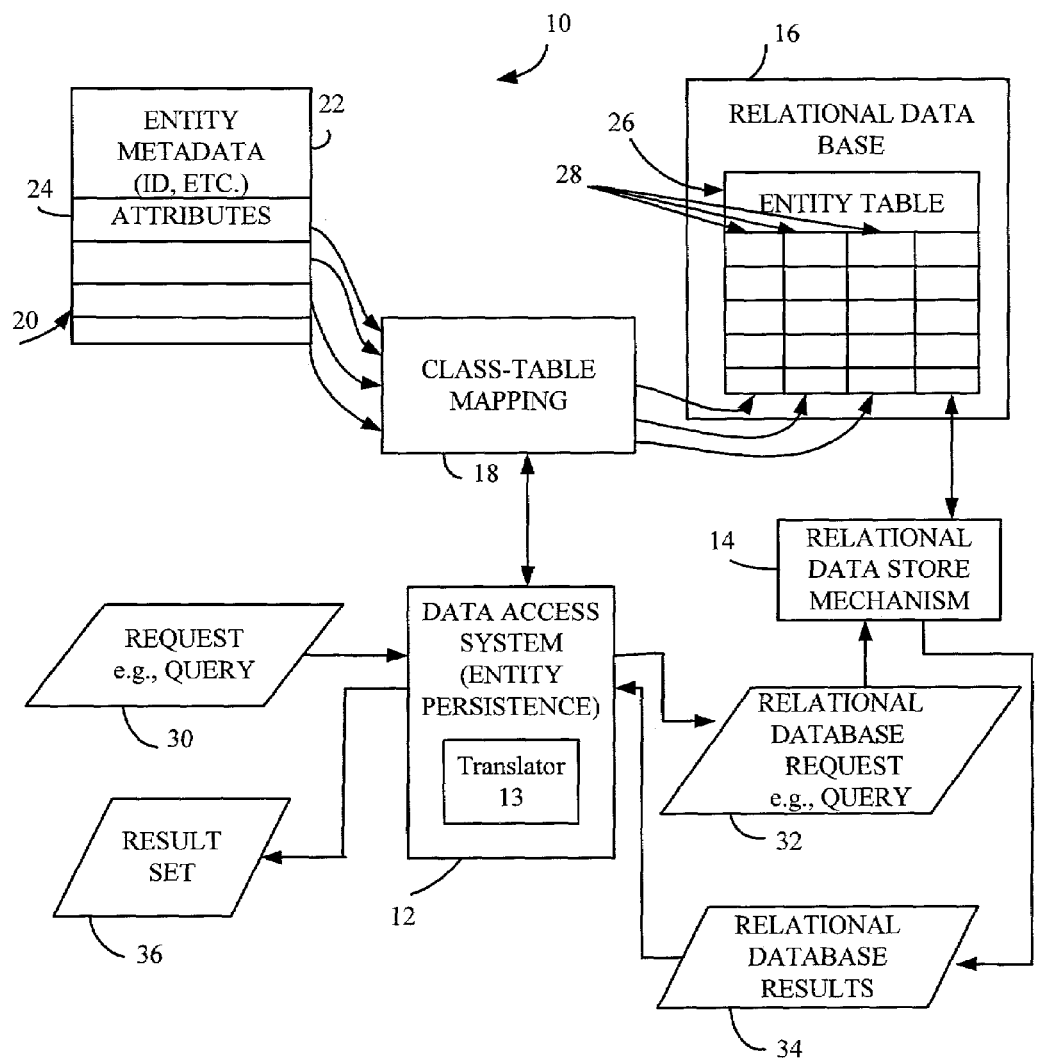
FIG. 2 is a block diagram of one embodiment of an object-relational data storage system.

FIG. 2 is a block diagram illustrating one embodiment of a data storage and accessing system 10. System 10 includes data access system (or entity persistence system)12, relational data store mechanism 14, relational database 16, and class-table mapping 18. System 10 is illustratively an object-relational (O-R) data storage system in which stored data can be referred to in terms of entities (or objects) and their properties, rather than elements of the data base schema, such as tables and columns. FIG. 2 illustrates one mechanism for doing this.

As shown in FIG. 2, the data can be organized in terms of entities 20 (which is used interchangeably herein with the term objects). Each entity illustratively includes a metadata portion 22 and a remaining property portion 24. The metadata portion 22 describes the entity 20, while the remaining property 24 define further attributes of entity 20, such as the data stored therein. Each of the property in entity 20 is mapped to a corresponding entity table 26 and a specific column 28 in a given entity table 26.

Data access system 12 can receive various forms of a request such as a query 30 which specifies an entity, or portions of an entity or group of entities, to be queried. Query 30 can illustratively be expressed in terms of objects ("entities") and properties rather than in terms of tables and columns. The particular manner in which queries are expressed does not form part of the present invention.

Data access system 12 receives the query 30 and accesses class-table mapping 18. In this way, data access system 12 can determine the location of the data for the entities identified by query 30. Data access system 12 includes a translator 13 that translates query 30 into a relational database query 32 which is suitable for input to relational data store mechanism 14. In one illustrative embodiment, relational data store mechanism 14 is a server that operates according to the SQL programming language in accessing relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36.

Figure 3:
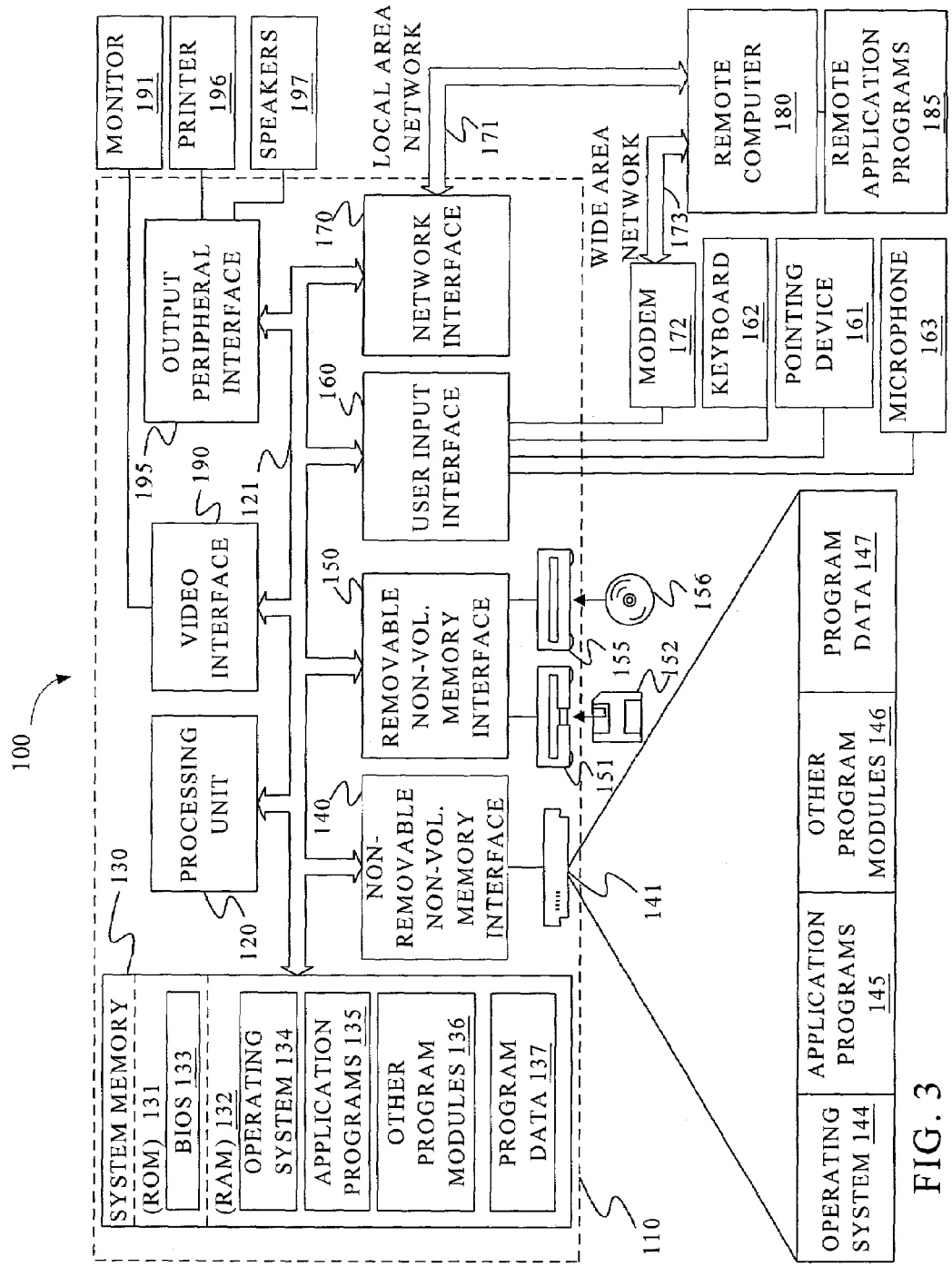
FIG. 3 is a block diagram of an environment in which the present invention can be used.

FIG. 3 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 3 illustrates operating system 134, application programs 135, other program modules 136, and program data 137.

The computer 110 may also include other removable/non-removable volatile/nonvolatile computer storage media. By way of example only, FIG. 3 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 3. However, the present invention can be carried out on a server, a computer devoted to message handling, or on a distributed system in which different portions of the present invention are carried out on different parts of the distributed computing system.

One embodiment of hypermedia system 9 is a system for creating links among objects or entities based on logical relationships between those objects, even when no physical relationship necessarily exists. One embodiment allows the logical relationships among such entities to be surfaced as links in a hyperspace, thus making the entities themselves the nodes of the hyperspace.

Figure 4:
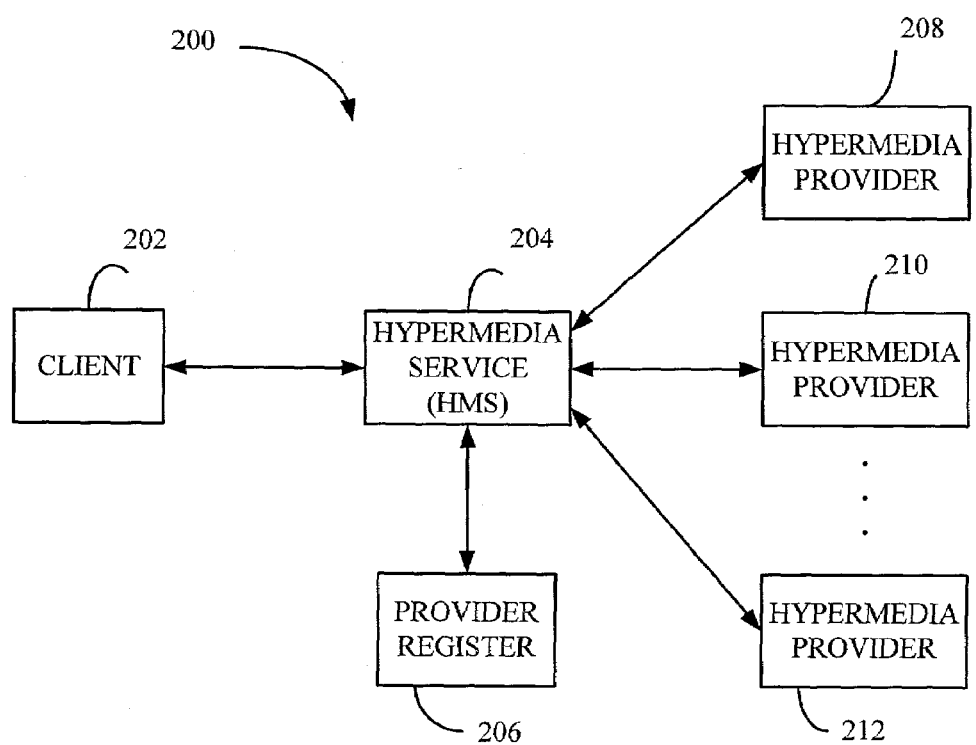
FIG. 4 is a block diagram of a hypermedia service system in accordance with one embodiment of the present invention.

In general, "hypermedia" is referred to as a mechanism for navigating a hyperspace which is comprised of a set of nodes and the hypermedia links that join those nodes. One embodiment of a hypermedia architecture is illustrated in FIG. 4. The hypermedia architecture 200 shows a client 202 that communicates with hypermedia service 204. Hypermedia service 204 accesses a provider register 206 and also communicates with a set of hypermedia providers 208, 210 and 212. Hypermedia service (HMS) 204 is illustratively the central point where clients 202 request hypermedia (i.e., hypermedia links or simply links). Hypermedia providers 208-212 are registered with HMS 204. Providers 208-212 are the points at which the links are actually created. New providers 208-212 can be registered with HMS 204, thus allowing extensibility.

The data that is transferred between client 202 and HMS 204, and between HMS 204 and providers 208-212 conforms, in one illustrative embodiment, to an XML schema attached as an exhibit hereto. The definition of a "link" in the schema includes a link category. Link categories are discussed in greater detail below. Suffice it to say for now that new categories may be defined by a hypermedia provider, thus allowing additional extensibility.

Figure 5:
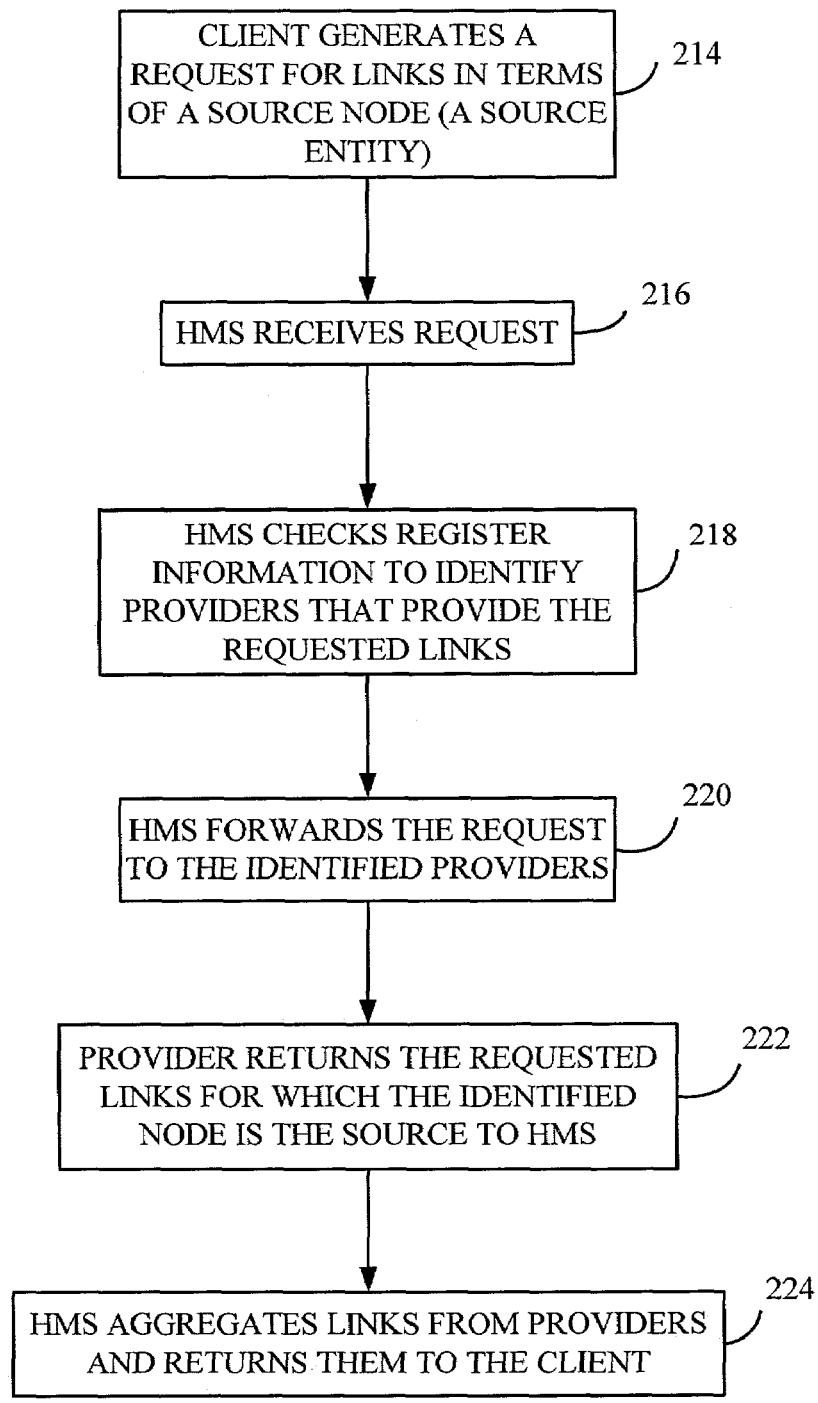
FIG. 5 is a flow diagram illustrating how link requests are processed by the hypermedia service system in accordance with one embodiment of the present invention.

FIG. 5 is a flow diagram better illustrating how a client 202 requests links from hypermedia system 200, and it will be described in conjunction with FIG. 4. In one embodiment, the HMS 204 and link providers 208-212 are objects that expose application programming interfaces (APIs) having methods to accomplish the functionality described. Assume that client 200 is displaying a list of customer entities (ther term "entities" is used herein interchangeably with the word "object"). Assume also that the client wishes to display a set of links to the user for possible traversal. Client 202 first generates a request for links in terms of a source node (i.e., a source entity or a source object). In this example, the client would request the links for the customer object. The request also illustratively specifies which categories of links to be retrieved. The links can represent relationships between nodes, as well as actions that can be performed on nodes or any other destination specified.

There are three types of links that can be retrieved: class links, instance links and instance specific links. Class links have the context of a class. They represent either a relationship to a destination node, or an action that can be performed. A class link provides information that is indicative of where a client can traverse to, or what operations can be performed, as they pertain to a particular class.

Instance and instance specific links have the context of an instance. The difference between the two types is that instance specific links are directly tied to a specific instance of an entity (or object), and instance links are tied to a class, but an instance of that class must be specified in order to traverse the link. An instance or instance specific link provides information indicative of where the client can traverse to, and what operations can be performed, with the particular instance being examined.

All three types of links can be traversed. Traversal returns the destination node of the link. If the link represents an action, traversal performs the action the link represents, and may or may not also return a destination node.

In accordance with one embodiment of the hypermedia system, the type of link is not the only manner in which links may be grouped. Links also illustratively belong to a link category. One example of a link category is a metamodel category. Briefly, links that belong to this link category represent associations between entities. These associations are captured in the metamodel (or object model) of the system.

In addition to being a grouping mechanism, a link category also defines a protocol that is followed by the particular providers 208-212 that supplied the link. The link category gives client 202 an indication of what type of information the link represents, and what type of object will result from traversal of the link. All links of the same category can be handled in the same manner. In this way, client 202 is able to determine how to handle a link based on the link category to which it belongs.

Therefore, client 202 may generate the hypermedia request by requesting class, instance, or instance specific links, or a combination of these. The client 202 can also specify a set of link categories and only links from those categories will be returned. If no category is specified, links from all categories will be returned. In any case, once client 202 has generated the request for links, and identified a node which will serve as the source of the link, it provides the request to HMS 204. Generating the request and providing it to HMS 204 is indicated by blocks 214 and 216 in FIG. 5.

HMS 204 then checks register 206 for information to identify the particular providers 208-212 that provide links that have, as a source node, the node identified by client 202 as the source of the links. This is indicated by block 218. In other words, during the registration process, providers 208-212 provided HMS 204 with information about the link categories, link types, and node classes for which the provider provides links. This information is stored in register 206. Therefore, when HMS 204 receives a request from client 202, it checks register 206 to determine which providers it should access.

HMS 204 then forwards the request generated by client 202 to the identified providers 208-212 which will provide links having the source node identified by client 202 as the source of the link. This is indicated by block 220.

The providers which receive the request, in turn, return the requested links to HMS 204. This is indicated by block 222. HMS 204 then aggregates all of the links from the providers 208-212 which have responded with links, and returns those links to client 202. This is indicated by block 224 in FIG. 5.

Query builder 6 can be any system for building queries against a database system, such as system 10. Therefore, a detailed discussion of builder 6 is not provided. Suffice it to say that query web services component 17 provides a number of helpful functions, which can be used by builder 6 in creating a query based on inputs from client 5. These functions are discussed below.

Entity folder system 15 is a system for storing queries or references to queries in a hierarchical storage system (such as a folder system). A number of aspects of query folder system 15 are discussed in greater detail below. Also, the object model UML diagrams for entity folder system 15 are provided as appendices hereto.

Query services component 11 defines a query. Query web services component 17 interacts with component 11 to define queries and to perform, create, retrieve, update and delete (CRUD) operations on queries. Component 17 also interacts with component 11 to execute queries. Query service component 11 translates defined queries into a form suitable for data accessing and storage system 10 and performs the necessary interaction with system 10 to have the queries executed against the database.

Metadata system 7 stores medadata about objects in the system. The metadata indicates what objects are available to query, and what properties on those objects are queryable. Both system 17 and system 11 access metadata system 7 during processing.

Figure 6:
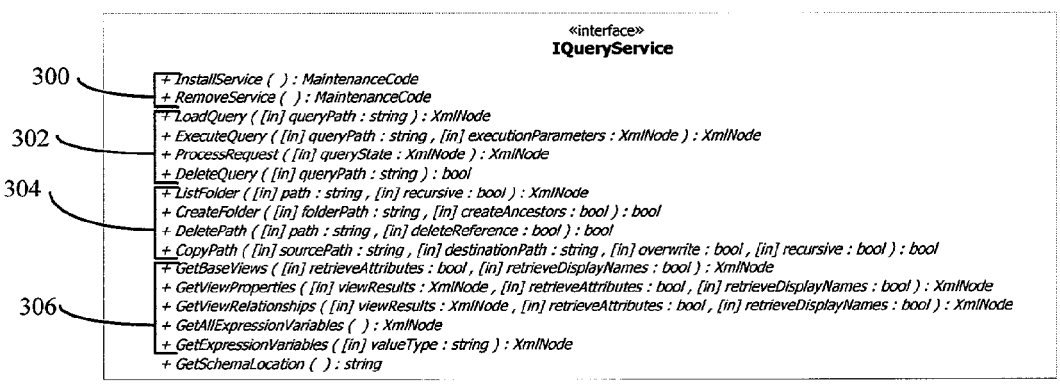
FIG. 6 illustrates an application programming interface.

FIG. 6 illustrates the interface exposed by query web services component 17. FIG. 6 shows that the first two methods are simply administrative methods for installing and removing query web services component 17 from a system. Those methods are designated by numeral 300.

The next four methods can be invoked to load a query from folder system 15, execute a query in system 10, perform a process request (such as traversing a hypermedia link at hypermedia retrieval/traversal system 9) and to delete a query stored in query folder system 15. These methods are indicated by the numeral 302.

It should be noted that in one embodiment, a single method (such as ProcessRequest) can be used to perform all query-related operations (such as load, execute, create, save, delete, traverse a hyperlink, move next, move previous, etc. . . . ). While the other functions are helper functions that allow a client to more easily perform these operations.

The next four methods can be invoked to perform manipulations in query folder system 15. For example, the methods can be invoked to list a folder, create a folder, delete a path through the folder system, or copy a path through the folder system. These methods are designated by numeral 304.

The next five methods can be invoked to retrieve metadata from metadata system 7 to aid client 5 in building a query. Pieces of the metadata can be pulled by client 5 into a new XML element used to define a query (e.g., QueryDefinition). For example, the methods can be used to obtain basic views in the system and to obtain properties and relationships that can be viewed. The methods dealing with views allow a client to create queries by supplying them with lists of available views which can be used as the basis for their query. Metadata about these views, such as lists of available properties and lists of associated views, can also be retrieved. Clients can use this information to create queries that have multiple, joined views, complex restrictions with system variables and user-supplied parameters, and multiple sorts. Thus, the methods allow expression variables to be retrieved as well. These methods are designated by numeral 306.

Figure 7:
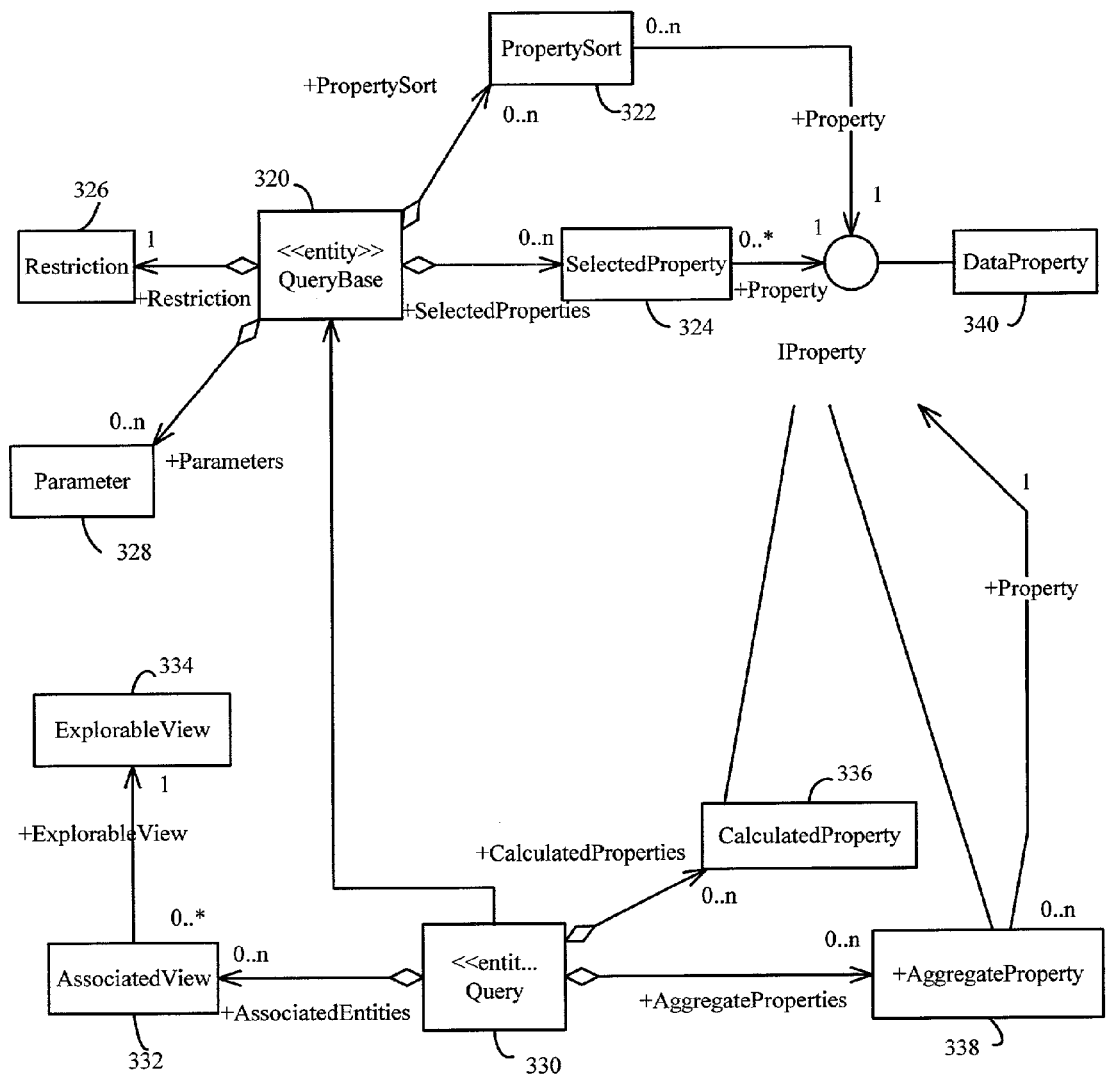
FIG. 7 illustrates a UML diagram of an object model for implementing the application programming interface shown in FIG. 6.

The final method allows the client to obtain the location of the schema used to define the format that the output will conform to and that the input must conform to. FIG. 7 is a UML diagram showing the object model that defines the classes that are used to define a Query and perform CRUD operations on the Query. These classes provide methods that only allow a client to build a valid query. For example, if the client is building a Query on a Customer, then these methods only allow the client to select properties on the Customer entity. FIG. 7 shows an abstract QueryBase class 320 that holds references to PropertySort class 322, SelectedProperty class 324, Restriction class 326 and Parameter class 328. The Query instance 330 inherits those references. Instance 330 also holds references to AssociatedView class 332 which, itself, references ExplorableView class 334. Query instance 330 also holds a reference to CalculatedProperty class 336 and AggregateProperty class 338, that provide arithmetic operations on other properties (calcuatedProperties) or aggregation of other properties (AggregateProperties). The other properties can be, but need not necessarily be, DataProperties 340.

The functionality exhibited by the object model shown in FIG. 7 is discussed by stepping through the basic structure of an API call, in conjunction with a discussion of related examples of Queries that component 17 has translated into xml that conforms to the schema of component 17. There are four examples attached as appendices hereto. The first example (labeled Example 1) is an API call which embodies a query to retrieve from the relational database 16 all employees from a specified city. The second example (Example 2) is a query to retrieve all items with requests to certain entities which have hypermedia, the third example (Example 3) is a simple query that retrieves a list of all customers from the database and the fourth example (Example 4) is a more complex query that lists all sales orders. It returns the name of the customer who placed the order, the employee who wrote the order, the names of the products on the order, and the name of the vendor the product came from. A total row count is also retrieved as well as all the attributes for the properties on the query.

The first two examples will be discussed, while the last two are simply provided as further examples of the functionality of the system. The first two examples will be discussed with respect to FIG. 8, which is a list of the basic elements in the API call.

Referring to both FIG. 8 and Example 1, a number of different document types are identified. It should be noted that no order dependency exists among the sections described below, but are described in but one logical order. The first is referred to as queryState. This identifies the root of the query documentsrequest, queryDefinition, queryResults, diagnostics, queryBookmark, hypermedia elements and all children of queryState. The next is referred to as the request. The request is supplied by the client and indicates what the client wishes to do. The client can also specify various parameters, such as block size, attributes to retrieve, etc. In Example 1, it can be seen that in the request, the user has requested that a query be executed. The query to be executed is identified by its path "/EmployeesFromCityX". This query path refers to a path within folder system 15 that identifies a location holding a reference to the persisted query that can be executed.

Of course, other actions can be taken as well. For example, the load action can be taken in which a query is loaded (i.e., its query definition is retrieved from the database). If the user specifies to load a query, the user also points to a query to be loaded The query services system 11 retrieves from the database (through system 10) a persistent query that has been identified in the folder system. The persistent query is retrieved and placed in the query definition section. This is described in greater detail below.

After the request section, the actual query definition section is found. As stated above, if the user specifies the action as loading a query, the system locates the query and loads it into the query definition section. However, the system allows the user to modify the query prior to executing the query. For example, the user can add or subtract properties to be retrieved, change restrictions, modify the sort order, etc. The user then simply needs to change the requested action to execute and the modified query is passed to query execution system 10 for execution.

Within the query definition section are several sections of note. First is the views section. This section allows the user to identify certain types of views to be returned for the entities being queried.

The next section is referred to as available properties. In this section, component 17 identifies what types of properties can be queried by the client. For example, some properties are not queryable, such as those that are derived. Therefore, when creating the query, data is returned from component 17 (and ultimately from metadata system 7) telling the query creator which properties of the specified entity are queryable on the entity that the query is being built from. Query web services component 17 then only allows the creator to choose from those properties which are queryable. This functionality is performed by the explorable view component 334 shown in FIG. 7. Explorable view component 334 not only determines whether properties are queryable because they were derived (or for any other reason, such as that they are not mapped or the author of the entity has added a Hidden attribute to the property that indicates that the property is not explorable) but also accesses a security system to determine whether the user has access to view certain properties. The operation of the security system can be performed in any manner that provides component 334 with access to it, and does not form part of the invention. In either case, properties which are not queryable by the present user are not presented for inclusion in the query.

The associated views component 332 also provides view information to query services component 11. That information indicates which views are associated with the entity being queried and also indicates how those views can be joined. In Example 1, the available properties are listed and include address, birth date, city, country, extension, first name, etc.

The next section is entitled selectedProperties. This indicates which properties the user has selected in the query. In Example 1, it can be seen that the two selected properties correspond to viewProperty3 (the city where the employee resides) and viewProperty6 (the first name of the employee). The functionality to obtain selected properties is implemented by component 324 in FIG. 7.

The next section is referred to as sorts. This indicates how the result set is to be sorted. In Example 1, the result set is to be sorted on viewProperty6 (the first name of the employee) in ascending order. The property sorting functionality is provided by component 322 in FIG. 7.

The next section is referred to as the parameters section. Parameters are user substitutable place holders in a query restriction. For example, assume that a client wishes to build a query to find all customers in a given state, but does not want that query to be tied to any specific state. Instead, the user desires to build a generic query to retrieve this information and have the generic query persist so that it can be used at later times. In that case, the user defines a parameter by associating a prompt with the parameter and specifying a data type to be received in response to the prompt. In Example 1, it can be seen that the parameter (labeled parameter1) is associated with a data type "string" and a prompt which is provided through a user interface to the user and which reads "Enter the name of the city to search for employees in:". When the query is executed, this piece of code executes itself and returns a value which corresponds to the value entered by the user. In Example 1, it can be seen that the value returned by the code is "Seattle" because this was entered by the user in response to the prompt.

Then, before the query is passed to query execution system 10 to be executed, the value for "parameter1" is substituted into the restriction section, which is the next section to be discussed.

The restriction allows the user to restrict the query by specifying restriction values. In Example 1, the restriction is that "viewProperty3" (the city where the employee resides) is equal to (as specified by the Boolean operator =) "parameter1" as discussed with respect to the parameters section above, the value entered for "parameter1" was "Seattle". Therefore, prior to handing the present query to query execution system 10 for execution, query services 17 substitutes for "parameter 1" the value "Seattle". Therefore, the restriction essentially requires that "the city where the employee resides is Seattle". The functionality for implementing the parameter and restriction sections is performed by components 328 and 326 in FIG. 7, respectively.

Another section, not shown in the example, is referred to as "variables". Like parameters, variables are substituted into a restriction requirement prior to execution of a query. However, unlike parameters, variables are not user-defined. Instead, variables are defined by the system. For example, as with parameters, code can be associated with a variable wherein the code executes itself when the query is executed. The value returned by execution of that code is substituted into a query restriction before the query is executed against the database. One example of such a variable may be code that derives the current clock time. In that case, the code may simply call a system function (or look wherever the current clock time is kept) and obtain a value associated with the current clock time that is substituted into a query restriction.

A number of other features which are not illustrated by the API call of FIG. 8 include "CalculatedProperty" value. A CalculatedProperty is a method that calculates a value by mathematically manipulating properties which are being queried. For example, a total cost can be calculated using the CalculatedProperty function by multiplying the cost per unit times the number of units, both of which may presumably be properties in an entity.

A method referred to as AggregateProperty is similar, but it returns one value per group of properties queried. For example, an AggregateProperty may return a value which corresponds to the sum of an entire group of properties. The functionality associated with CalculatedProperties and AggregateProperties is provided by components 336 and 338 in FIG. 7.

Having finished a discussion of the query definition, the next section FIG. 8 is referred to as diagnostics. The diagnostics section returns success indications, exceptions, diagnostic messages etc.

The next section is the queryResults section. The queryResults section contains all data results of an executed query. Each piece of data in the query results section refers back to a portion of the query definition so that the client can see what data type, display names, properties, etc. the returned data corresponds to.

In Example 1, it can be seen that each result corresponds to both a row ID and a selectedProperty. The selectedProperty identifies the portion in the query definition that spawned the query result. For example, in the first result, the value "Seattle" is associated with the "selectedProperty1" value. Similarly, the value "Laura" is associated with the "selectedProperty2" value.

The next section is referred to as hyperMedia. When a query is executed, and the query requests hyperMedia, this section provides a list of potential links for the result set. Example 2 includes a query which requests hyperMedia. It can be seen that the hyperMedia section lists the links by name, link type, link category, the source node and also the destination node. If the user decides to traverse the link, the user simply passes back in this section, specifying which row in the result set and which link from the collection of links that the user wishes to traverse.

Because the result of a traversal can be a query, and because the query will be an entity, the query entity is identified by traversing the link. A query definition is generated for the query entity in the same way a query definition is generated for a query that is referenced by a path into the folder system. The query is then passed to query execution system 10 where it is launched against the database.

The final section is referred to as the bookMark section. Query execution system 10 may, in many instances, allow the client to return only a small number of the total records responsive to a query at any one time. For example, the system may allow the client to view only 10 records at a time, even through the query produced a query result that contained 10,000 records. The method for moving from one page of records to the next page of records is referred to as a "move next" operation, while the method of moving from a current page of records to a previous page of records is referred to as a "move previous" operation.

Recall that when a query is executed, before it is handed to the query execution system 10, the value of all of the parameters and variables is calculated and the appropriate substitutions are made in the restriction section. It may be desirable to avoid having to recalculate these values each time a client wishes to perform a "move next" or "move previous" operation. In other words, it may be undesirable to be required to retranslate the entire query definition into a form suitable for use by query execution system 10 simply because the user wishes to page down or page up through a large result set.

Therefore, each time results are returned, portions of the query definition (including the evaluated parameters and variables), as well as a bookmark to next and previous locations in the database system, are serialized into the bookMark value and provided back to the client along with the result set. Because this is not a value that is of interest to the client, it may illustratively be encoded prior to handing it back to the client. Therefore, when the client wishes to perform a "move next" or "move previous" operation, the client hands back the bookMark, along with the type of operation desired to component 17. By reading the bookMark, query web services component 17 can identify what records need to be returned next, without reevaluating the variables and parameters.

Figure 9:
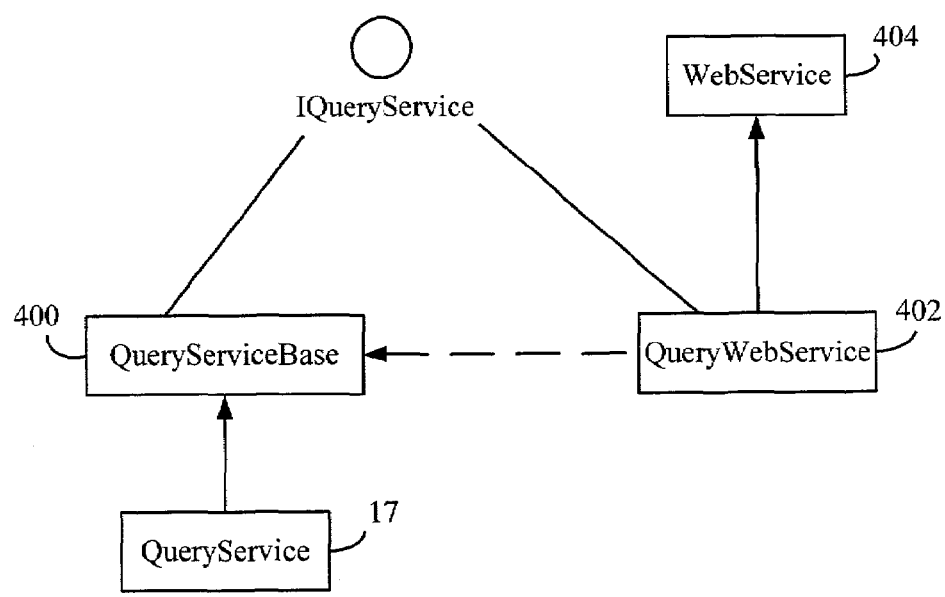
FIG. 9 illustrates the use of a query service subsystem in a web environment.

FIG. 9 illustrates yet another embodiment of the present invention. FIG. 9 illustrates QueryService component 11, QueryServiceBase component 400, QueryWebService component 17, and WebService component 404. The set of APIs that QueryWebService component 17 exposes is defined by the IQueryService interface in FIG. 6. This interface is implemented by the WebService component 404 itself and the QueryServiceBase component 400. The QueryServiceBase component 400 actually implements the functionality of this interface and is used by the WebService component 404. The QueryService component 11 is available for use by applications that are on the same server as the WebService. Thus, for components on the same server, they can call either the local class or WebService, but they are not required to go through the WebService.

It can thus be seen that the present invention provides a number of significant advantages. For example, by storing queries as entities, the present invention allows all operations performable on entities to be performed on queries, such as create, retrieve, update and delete. This also allows queries to persist where otherwise they could not.

In addition, the present invention allows queries to be stored in a hierarchical folder system and to simply be referenced by a path into that system.

Similarly, the present system serializes and stores the query definition and hands it to the client with query results. Therefore, if the client hands back the definition, the system need not reevaluate or re-derive the query definition.

The present invention also provides user defined parameters and system-defined variables which can be substituted into restriction requirements. This provides a great deal of flexibility.

The system also provides a check on properties to be queried. The system only allows those properties which are queryable to be queried.

Further, in order to load a query, the user simply needs to specify a reference to a query and the entire query definition will be returned to the user in the same document. The user can then simply revise the query as desired prior to having it executed.

In addition, the present invention wraps a significant amount of functionality into one set of APIs. The functionality wrapped into the APIs includes functionality for retrieving and traversing hyperMedia links for query results, for executing queries, creating queries, and storing queries in a hierarchical data store.

Although the present invention has been described with reference to particular embodiments, workers skilled in the art will recognize that changes may be made in form and detail without departing from the spirit and scope of the invention.

What is claimed is:

1. A system for providing services for queries against a database, comprising:

a first component, stored on a computer readable storage medium, coupleable to the database and exposing an interface having methods which, when invoked, receive a request from a client and perform object-based operations on a query object, the query object defining a query executable against the database and the object-based operations including a store operation to persist the query object for later use, the first component being further configured to return the query object, for user modification, in response to receiving a request to return a stored query object and a reference to the query object;

wherein the first component is configured to persist the query object and include in the query object system-substitutable variables as query restrictions, the system-substitutable variables being defined by the system and are comprised of executable code, executed when the query defined by the query object is executed against the database; and wherein the first component is configured to receive user-selection of properties of entities stored in the database to be queried, and to present for user selection only properties of the entities to be queried that are queryable by the user.

2. The system of claim 1 wherein the first component is configured to store the reference to the query object in a folder system.

3. The system of claim 2 wherein the folder system is arranged hierarchically.

4. The system of claim 1 wherein the first component is configured to return query results from the database to the client.

5. The system of claim 4 wherein the first component is configured to generate a serialized representation of at least a portion of the query object, and return the serialized representation to the client along with the query results.

6. The system of claim 5 wherein the serialized representation is indicative of evaluated variables from the query object.

7. The system of claim 5 wherein the serialized representation is indicative of evaluated parameters from the query object.

8. The system of claim 1 wherein the first component is configured to persist the query object and include in the query object user-substitutable parameters as query restrictions.

9. The system of claim 8 wherein the user substitutable parameters are comprised of executable code, executed when the query defined by the query object is executed against the database.

10. The system of claim 1 wherein the object-based operations comprise:
creating a query object.

11. The system of claim 1 wherein the object-based operations comprise:
retrieving a stored query object.

12. The system of claim 1 wherein the object-based operations comprise:
updating a stored query object.

13. The system of claim 1 wherein the object-based operations comprise:
deleting a stored query object.

14. A system comprising:
a processor configured to transmit data packets stored on a computer storage medium to a query service component that performs query services relative to the database system, wherein at least one of the data packets is defined by:
a request portion including request information indicative of a requested object-based operation with respect to a query, the request information, when read by the query service component, causing the query service component to perform the requested object-based operation on the query;
a query definition portion including query definition information defining the query;
a query path reference portion including query path information indicative of a location of a stored query;
a query results portion including result information indicative of results of executing a query against the database system; and
a hypermedia portion including hypermedia information indicative of hypermedia links associated with the result information.

15. The system of claim 14 wherein the query results portion includes query definition reference information that relates result information to a part of the query definition information.

16. The system of claim 14 and further comprising:
a bookmark portion including bookmark information indicative of a serialized representation of at least a portion of the query definition information.

17. The system of claim 16 wherein the bookmark information is indicative of a serialized representation of a next subsequent location in the database system, subsequent to a location last accessed based on the query.

18. The system of claim 16 wherein the bookmark information is indicative of a serialized representation of a next previous location in the database system, previous to a location last accessed based on the query.

19. The system of claim 16 wherein the bookmark information is indicative of a serialized representation of evaluated, substitutable place holders in the query.

20. The system of claim 14 wherein the request information comprises load information indicative of a requested query to be loaded.

21. The system of claim 20 wherein, when the requested query is loaded, the query definition information in the query definition portion defines the requested query.

22. The system of claim 14 wherein the request information comprises execute information indicative of a request to execute the query.

23. The system of claim 14 wherein the query definition portion includes view information indicative of a type of view to be returned for an entity being queried.

24. The system of claim 14 wherein the query definition portion includes available properties information indicative of queryable properties of an entity being queried.

25. The system of claim 14 wherein the query definition portion includes selected properties information indicative of user-selected properties of an entity being queried.

26. The system of claim 14 wherein the query definition portion includes sort information indicative of how query results are to be sorted.

27. The system of claim 14 wherein the query definition portion includes parameters information indicative of user-substitutable restrictions on the query.

28. An application programming interface (API) comprising a component stored on a tangible computer readable storage medium and configured to perform query services for queries against a database system, the API having query object manipulation methods which, when invoked, cause the component to perform object-based operations on one of a plurality of different stored query objects representative of queries executable against the database system, wherein the object-based operations include loading one of a plurality of different stored query objects based on a query reference, for execution against the database system, wherein the object-based operations include executing a query represented by a query object against the database system, and wherein the API further includes query referencing methods which, when invoked, cause the component to perform query reference operations in a hierarchically arranged query reference folder system, wherein the query reference operations include deleting path names of folders in the query reference folder system.

29. The API of claim 28 wherein the object-based operations include deleting a query object.

30. The API of claim 28 wherein the object-based operations include performing a process request in the database system.

31. The API of claim 28 wherein the query reference operations include listing contents of folders containing query references.

32. The API of claim 28 wherein the query reference operations include creating folders for containing query references.

33. The API of claim 28 wherein the query reference operations include copying path names of folders in the query reference folder system.

34. The API of claim 28 and further including query building methods which, when invoked, cause the component to perform query building operations by accessing metadata for use in building a query.

35. The API of claim 34 wherein the query building operations include displaying an indication of permitted views of data in the database system.

36. The API of claim 34 wherein the query building operations include displaying a list of viewable properties.

37. The API of claim 34 wherein the query building operations include displaying a list of associated views, associated with a selected view.

38. The API of claim 34 wherein the query building operations include displaying expression variables for use in building the query.

* * * * *